United States Patent
Huh et al.

(10) Patent No.: US 10,852,977 B2
(45) Date of Patent: Dec. 1, 2020

(54) SYSTEM FOR PROVIDING VIRTUAL DATA STORAGE MEDIUM AND METHOD OF PROVIDING DATA USING THE SAME

(71) Applicant: University-Industry Cooperation Group of Kyung-Hee University, Yongin-si (KR)

(72) Inventors: Eui Nam Huh, Yongin-si (KR); Ka-Won Lee, Yongin-si (KR); Yunkon Kim, Yongin-si (KR)

(73) Assignee: University-Industry Cooperation Group of Kyung-Hee University, Yongin-si (KR)

( * ) Notice: Subject to any disclaimer, the term of this patent is extended or adjusted under 35 U.S.C. 154(b) by 2 days.

(21) Appl. No.: 15/987,728

(22) Filed: May 23, 2018

(65) Prior Publication Data
US 2019/0361623 A1 Nov. 28, 2019

(51) Int. Cl.
*G06F 3/06* (2006.01)

(52) U.S. Cl.
CPC .......... *G06F 3/0644* (2013.01); *G06F 3/0604* (2013.01); *G06F 3/067* (2013.01); *G06F 3/0653* (2013.01); *G06F 3/0664* (2013.01)

(58) Field of Classification Search
CPC .... G06F 3/0644; G06F 3/0604; G06F 3/0664; G06F 3/0653; G06F 3/067
USPC .......................................................... 711/154
See application file for complete search history.

(56) References Cited

U.S. PATENT DOCUMENTS

| | | | | |
|---|---|---|---|---|
| 7,631,128 B1* | 12/2009 | Sgrosso | ................. | H04L 47/39 710/105 |
| 7,975,109 B2* | 7/2011 | McWilliams | ....... | G06F 12/0284 711/147 |
| 8,443,405 B2* | 5/2013 | Paik | ........................ | H04H 20/24 725/62 |
| 8,527,731 B2* | 9/2013 | Hanes | ................. | G06F 16/1824 711/173 |
| 9,626,376 B1* | 4/2017 | Chew | ..................... | G06F 16/178 |
| 2009/0222569 A1* | 9/2009 | Frick | ........................ | G06F 16/10 709/230 |

(Continued)

FOREIGN PATENT DOCUMENTS

| KR | 10-2012-0072241 A | 7/2012 |
|---|---|---|
| KR | 10-2014-0054950 A | 5/2014 |

(Continued)

OTHER PUBLICATIONS

W. Chang, Z. Tan, X. Gao and G. Chang, "The description of Serial ATA bus_ Protocol and the design of Serial ATA bus control chip HPT183," 2008 7th World Congress on Intelligent Control and Automation, Chongqing, 2008, pp. 6601-6606.*

*Primary Examiner* — Pierre Miche Bataille
(74) *Attorney, Agent, or Firm* — Studebaker & Brackett PC (57) ABSTRACT

A system for providing a virtual data storage medium according to an embodiment of the invention may be a system for providing a virtual data storage medium using data storage federation, where the system may include: heterogeneous data storage media including a multiple number of data storage media using different interfaces, protocols, and commands for using stored data; and a federation unit configured to generate a virtual data storage medium by federating the heterogeneous data storage media.

12 Claims, 8 Drawing Sheets

(56) References Cited

U.S. PATENT DOCUMENTS

| | | | | |
|---|---|---|---|---|
| 2010/0082819 A1* | 4/2010 | Wang | ............... | H04L 12/4625 |
| | | | | 709/227 |
| 2010/0094847 A1* | 4/2010 | Malan | ............... | G06F 16/972 |
| | | | | 707/705 |
| 2010/0235461 A1* | 9/2010 | Haba | ............... | H04W 12/08 |
| | | | | 709/213 |
| 2011/0208990 A1* | 8/2011 | Zerbe | ............... | G06F 1/08 |
| | | | | 713/501 |
| 2012/0131077 A1* | 5/2012 | Hom | ............... | G06F 9/45558 |
| | | | | 707/831 |
| 2013/0124800 A1* | 5/2013 | Priel | ............... | G06F 12/0811 |
| | | | | 711/122 |
| 2013/0282994 A1* | 10/2013 | Wires | ............... | G06F 3/0604 |
| | | | | 711/158 |
| 2013/0311740 A1* | 11/2013 | Watanabe | ............... | G06F 3/0647 |
| | | | | 711/165 |
| 2017/0177222 A1* | 6/2017 | Singh | ............... | G06F 3/061 |
| 2017/0195445 A1* | 7/2017 | Dowlatkhah | ......... | G06F 16/213 |
| 2018/0157444 A1* | 6/2018 | Franciosi | ............ | G06F 3/0661 |

FOREIGN PATENT DOCUMENTS

| | | | | |
|---|---|---|---|---|
| KR | 10-2016-0012332 A | 2/2016 | | |
| KR | 10-2016-0061863 A | 6/2016 | | |
| WO | WO-2019104133 A1 * | 5/2019 | ............... | B25J 9/16 |

* cited by examiner

SYSTEM FOR PROVIDING VIRTUAL DATA STORAGE MEDIUM AND METHOD OF PROVIDING DATA USING THE SAME

BACKGROUND

1. Technical Field

The present invention relates to a system for providing a virtual data storage medium and a method of providing data using the same. More particularly, the present invention relates to a system for providing a virtual data storage medium based on user policies for data storage federation and a method of providing data using the same.

2. Description of the Related Art

With developments in mobile communications, big data, and the Internet of things, the variety and amount of data generated are growing at a rapid pace. The Gartner Top 10 Strategic Technology Trends, announced each year by the American IT research and advisory firm Gartner, Inc., have always addressed the topic of 'data of the most recent five years,' in addition to which there have been an increasing number of cases drawing attention to the value and usefulness of data, leading the public's interest in data to increase also. Such interest in data focuses mostly on the utilizing of data for creating new contents and services.

In order to satisfy this interest, the means for storing and managing data is of great importance, as this allows an increased workability of the data. Various types of data storage are being utilized, examples of which may include direct-attached storage (DAS), network-attached storage (NAS), and cloud storage. As each type of storage provides a different interface that uses different protocols and commands, the different types of storage have to be managed separately in storing and using data. Thus, when a user uses two or more types of storage, the workability of the data may be decreased.

Also, each type of storage offers little consideration for sharing and providing data, permitting only a specific user to use the data of the storage. Therefore, even if a piece of data needed by a user actually exists, the user has no way of knowing whether or not such data exists because the user is unable to access the data. This may also be seen as a cause of decreased workability.

Different types of storage media that exist in different management domains carry the purpose of simply storing data. Also, as each of storage medium uses a unique method of communication, there are difficulties in interoperation. The cloud has been developed, which enables users to store data in the cloud, but functions for sharing data are limited, amounting merely to providing a particular user with authorization to access stored data or sending the user a link.

Increases in the amounts of various data are triggering advances in storage technology also. While it would be ideal to consider compatibility between existing types of storage and newly developed types of storage, this may not always be the case in the development of new types. Thus, in order to resolve the difficulty in concurrently using data stored in an existing type of storage and data stored in a newly developed type of storage, there is a need for a model and policy with which stored data can be virtualized again and provided to many persons.

SUMMARY OF THE INVENTION

An objective of the invention is to unify heterogeneous data storage media into a single logical data storage medium to provide a virtual data storage medium.

Another objective of the invention is to provide a system and method that enable all users to search and use data in a data sharing environment by setting sharing policies on the data stored in the virtual data storage medium.

One embodiment of the invention provides a system for providing a virtual data storage medium using data storage federation, where the system includes: heterogeneous data storage media including a multiple number of data storage media using different interfaces, protocols, and commands for using stored data; and a federation unit configured to generate a virtual data storage medium by federating the heterogeneous data storage media.

Another embodiment of the invention provides a method of providing data by using a system for providing a virtual data storage medium, where the method includes: receiving input of to-be-stored data; checking the connectivity of heterogeneous data storage media forming a virtual data storage medium; detecting an overall capacity of the heterogeneous data storage media; detecting an individual capacity available for storing data in one data storage medium from among the heterogeneous data storage media; and storing the to-be-stored data in the heterogeneous data storage media.

Still another embodiment of the invention provides a method of providing data by using a system for providing a virtual data storage medium, where the method includes: receiving a data request; searching the stored location of the requested data; if the requested data is stored in a distributed form, requesting the distributed data stored respectively in heterogeneous data storage media; combining the distributed data; and transmitting the combined requested data.

A system for providing a virtual data storage medium and a method of providing data using the system, according to certain embodiments of the invention, can solve the problem of compatible operation between heterogeneous storage media while increasing the workability of data by creating a data sharing environment.

A system for providing a virtual data storage medium and a method of providing data using the system according to certain embodiments of the invention can reduce the cost of establishing infrastructure as compared to the case of using existing heterogeneous storage structures.

Additional aspects and advantages of the present invention will be set forth in part in the description which follows, and in part will be obvious from the description, or may be learned by practice of the invention.

DETAILED DESCRIPTION OF THE INVENTION

Descriptions of specific structures or functions relating to certain embodiments derived based on the concept of the present invention as set forth in the present specification are provided merely as examples for explaining the embodiments derived from the concept of the invention. The embodiments can be practiced in a variety of implementations and are not limited to the embodiments described herein.

A detailed description of certain embodiments of the invention is provided below, with reference to the accompanying drawings.

Figure 1:
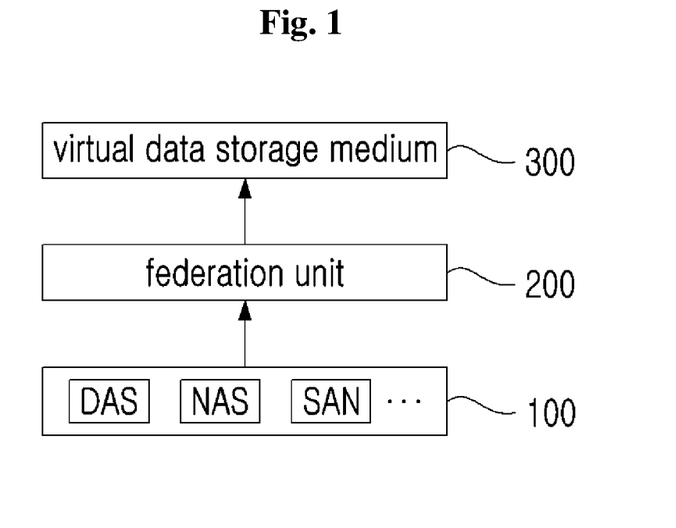
FIG. 1 is a block diagram illustrating a system for providing a virtual data storage medium according to an embodiment of the invention.

FIG. 1 is a block diagram illustrating a system for providing a virtual data storage medium according to an embodiment of the invention.

As illustrated in FIG. 1, a system for providing a virtual data storage medium according to an embodiment of the invention may be a system configured to enable virtual data storage using data storage federation and may include heterogeneous data storage media 100, which include a multiple number of data storage media that use different interfaces, protocols, and commands for using stored data, and a federation unit 200 that federates the heterogeneous data storage media 100 to generate a virtual data storage medium 300.

The heterogeneous data storage media 100 may be associated with DAS (direct-attached storage), NAS (network-attached storage), SAN (storage area network), cloud storage, etc., as methods for storing data.

DAS refers to an external storage device that is directly connected to a server or computer via a dedicated cable without passing through a network. This type of storage offers the easiest method of compensating insufficient storage space in a server/client environment, i.e. physically adding an external storage device to the server itself. As an external storage device can be added to each server connected to a network, this method allows access to data from a physically close location and allows easy expansions.

However, there are the vulnerabilities that continuously adding external storage devices to handle increases in data may lower the efficiency of the server, that sharing data is impossible, and that when the server of a network crashes, the storage devices mounted on the halted server are also made unusable.

NAS describes the concept of connecting a storage medium over a LAN, but strictly speaking, is not exactly the connecting of a storage medium over a LAN. LAN is based on the TCP/IP protocol, whereas the storage medium uses the SCSI protocol as the connection protocol. In order to enable communication between these different protocols, NAS entails a file server serving as an intermediary.

A SAN is a network that connects data storage devices of different types to one data server to collectively manage the data storage devices.

If various types of storage media as mentioned above are being utilized, when a user wishes to use two or more types of storage media, the workability of the data may be decreased.

The heterogeneous data storage media 100 according to an embodiment of the invention may refer to a data storage medium in which various types of storage media are included.

The federation unit 200 generates a virtual data storage medium 300 by federating the heterogeneous data storage media 100. Federation refers to combining two or more targets into one from a logical perspective; the data of two databases are not physically moved, but rather, are connected to form a logically single database.

Figure 2:
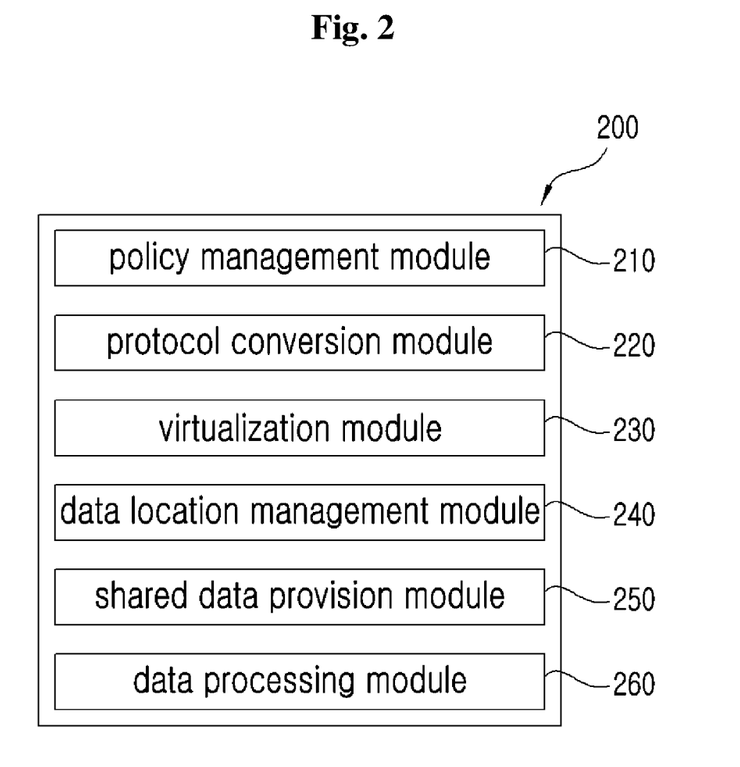
FIG. 2 is a function block diagram illustrating a federation unit according to an embodiment of the invention.

FIG. 2 is a function block diagram illustrating a federation unit according to an embodiment of the invention.

As illustrated in FIG. 2, the federation unit may include a policy management module.

In the present specification, a module can be implemented as a functional, structural coupling of hardware for executing a technical concept associated with the invention and software for operating the hardware. For example, the module can refer to a set of code and a logical unit of a hardware resource for executing the set of code and does not necessarily refer to a physically connected set of code or a type of hardware.

The policy management module 210 may store data in the virtual data storage medium 300 in correspondence with data sharing policies set by the provider. The sharing policies may refer to policies regarding the sharing of data stored by the provider in the virtual data storage medium 300 and can be divided into a non-sharing mode and a sharing mode, where the sharing mode can further be divided into read-only, write-permitted, copy-permitted modes, etc.

With the data stored in the virtual data storage medium 300 based on sharing policies, others can utilize data that may be shared according to the policies.

All data may be based on data policies set by a user of the data storage medium.

The federation unit 200 may include a protocol conversion module 220. The protocol conversion module 220 may convert a user request to fit a protocol or command of the heterogeneous data storage media 100. The heterogeneous data storage media 100 may be composed of storage media of different formats, and in order to respond to a data storage request, etc., by the provider and store data in the format of an individual data storage medium included in the heterogeneous data storage media 100, the protocol conversion module 220 may convert the interface, protocol, or command, etc., to the format of a storage medium.

As the heterogeneous data storage media 100 are associated with different protocols, the protocol conversion module 220 may be made capable of interacting with the heterogeneous data storage media 100 that supports different protocols, in order to process requests by the user of the data storage medium.

A virtualization module 230 may virtualize the heterogeneous data storage media 100 to form a storage medium and provide a portion thereof to the user independently. The virtual data storage medium 300 thus generated by way of the virtualization module 230 may be a collection of many heterogeneous storage media which the user can use from a single access point.

Each user of the data storage medium can use his/her own virtual data storage medium to generate, store, read, update, or delete data.

A data location management module 240 may manage the locations where data is stored and may virtualize data to form a data sharing environment that can be used by other users.

When the user of a data storage medium stores data in the storage medium, the data location management module 240 may designate the location where the data is to be located and may read or update stored data.

A shared data provision module 250 may provide shared data according to the policies set by the user of the data storage medium. The shared data may be provided in a catalogued format to enable searches by other users, who may freely read, write, copy, etc., according to the sharing policy of the data provider.

A data processing module 260 may divide inputted data or combine data that was stored in a divided form. When data stored is by a user of the data storage medium, the data can be stored divided for individual data storage media included in the heterogeneous data storage media 100, and conversely when the divided data is to be combined, the relevant operation may be performed by the data processing module 260.

A detailed description is provided above of the components included in a system for providing a virtual data storage medium according to an embodiment of the invention. A description is now provided below of the operation of the system for providing a virtual data storage medium, with reference to FIG. 3 to FIG. 5.

Figure 3:
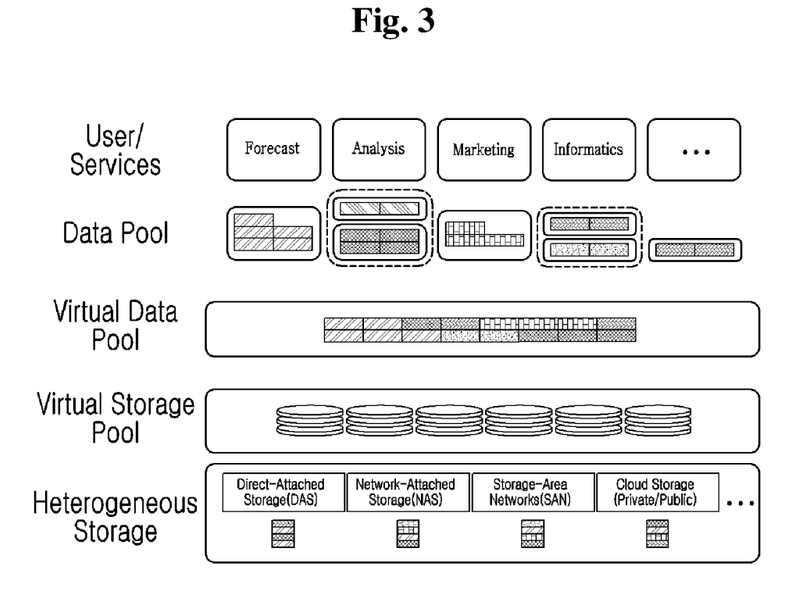
FIG. 3 is a conceptual diagram of a data storage federation model.

FIG. 3 is a conceptual diagram of a data storage federation model.

As illustrated in FIG. 3, the data storage federation model relates to virtualizing various heterogeneous data storage media 100 for storing data, to provide the various heterogeneous data storage media 100 in a virtualized form, and to sharing the data stored in the storage media according to the set policies. The data storage federation model can thus increase data workability.

If it were not for the system based on an embodiment of the invention, a user using heterogeneous data storage media 100 would face the inconvenience of storing and managing data individually. However, with the system according to an embodiment of the invention, the processing of a request from one user can entail automatically performing different requests (e.g. create, store, read, write, delete) distributed over the heterogeneous data storage media 100. Also, if other users have opened their data, the system provides an environment for enabling the use of such data, further increasing data workability.

FIG. 3 illustrates the concept of a data storage federation model, illustrating a structure in which storage media are integrated and data is federated via the abstraction and virtualization of the storage media as well as the abstraction and virtualization of the data. The heterogeneous storage media at the very bottom may abstract various types of storage media, use the interface of each storage medium, and provide a virtualized form to the user.

A virtual storage pool, via the virtualization of the storage media, can structure the physical storage media as logic levels, to assign the storage media to applications. According to a request from a user, a required storage medium may be assigned to an application, with the storage medium used in association with functions for the creating, storing, deleting, reading, writing, etc., of data.

Here, a virtual data pool can be formed according to policies set by the user, where the virtual data pool can be shared by other users. This can aid the reducing of redundant data and the increasing of data workability.

Figure 4:
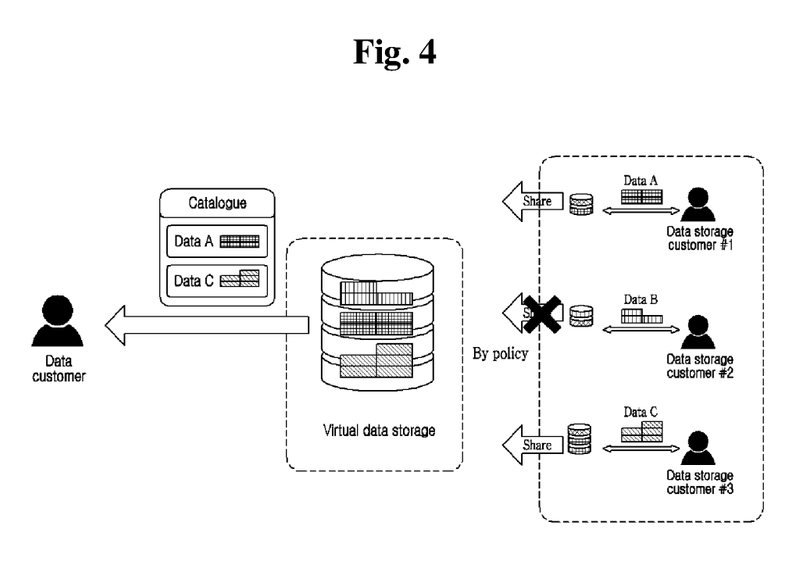
FIG. 4 is a conceptual diagram illustrating the sharing of data according to an embodiment of the invention.

FIG. 4 is a conceptual diagram illustrating the sharing of data according to an embodiment of the invention.

As illustrated in FIG. 4, a system for providing a virtual data storage medium according to an embodiment of the invention may store Data A, Data B, and Data C received from a first data storage user (Data Storage Customer #1), a second data storage user (Data Storage Customer #2), and a third data storage user (Data Storage Customer #3), respectively, with Data A, Data B, and Data C stored in a virtual data storage medium according to their respective sharing policies. When another user (Data Customer) makes a request, Data A and Data C, excluding Data B from the second data storage user, can be provided from the virtual data storage medium in the form of a catalogue, allowing the user (Data Customer) to utilize the data.

Thus, a system for providing a virtual data storage medium according to an embodiment of the invention can virtualize data to establish a data sharing environment that can be used by other users.

Figure 5:
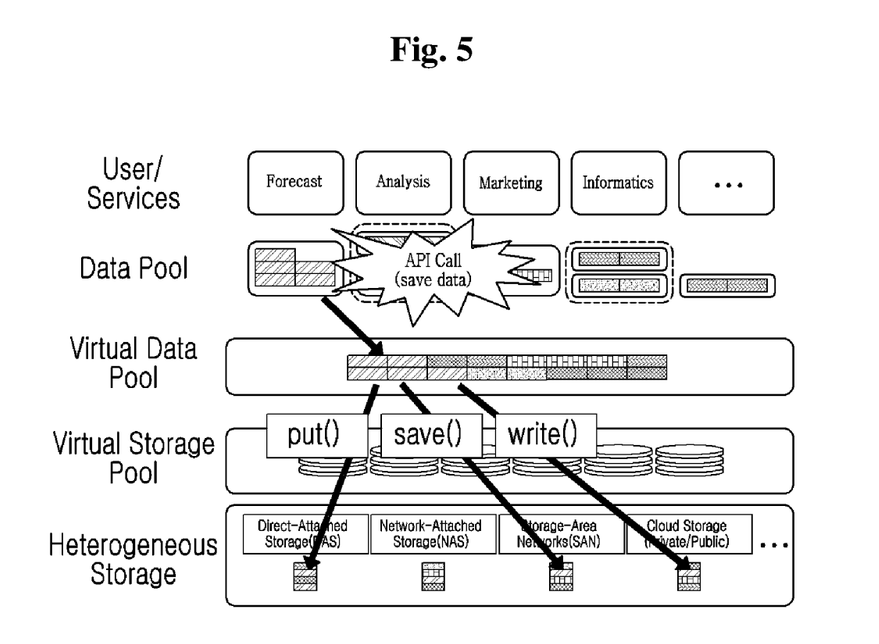
FIG. 5 is a conceptual diagram illustrating a case of automated request processing according to an embodiment of the invention.

FIG. 5 is a conceptual diagram illustrating a case of automated request processing according to an embodiment of the invention.

As illustrated in FIG. 5, when a forecast service saves data, the service may store the data in the assigned virtual data storage medium. As the virtual data storage medium is formed as a set of heterogeneous data storage media, the data may be stored automatically by utilizing a protocol suitable for each data storage medium.

A description is provided below of a method of providing data by using a system for providing a virtual data storage medium according to another embodiment of the invention.

Figure 6:
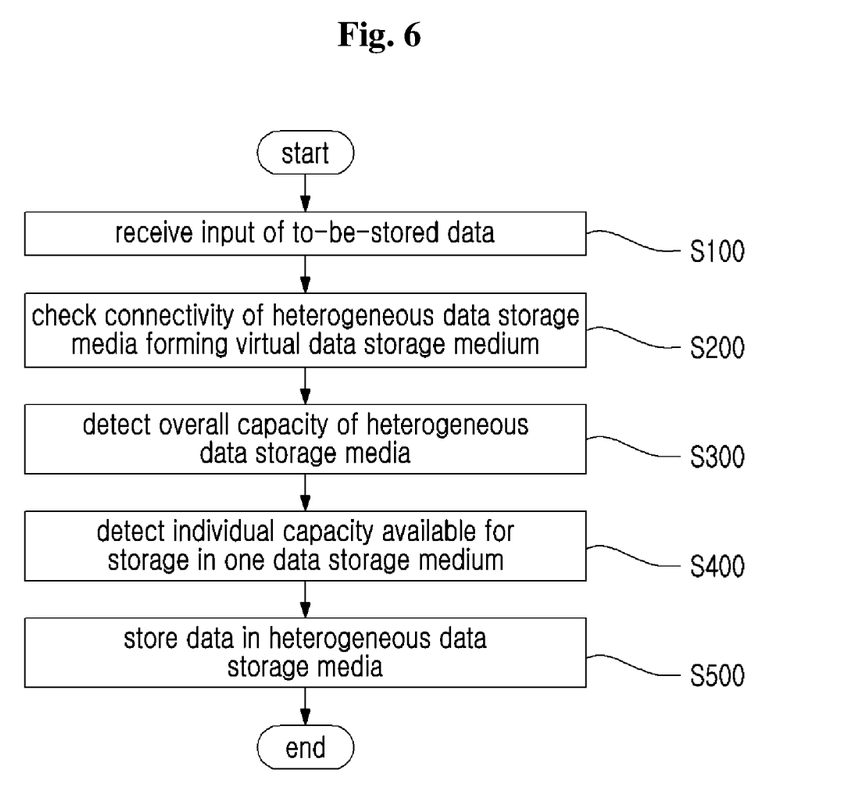
FIG. 6 and FIG. 7 are flowcharts illustrating a method of providing data using a system for providing a virtual data storage medium according to an embodiment of the invention.
Figure 7:
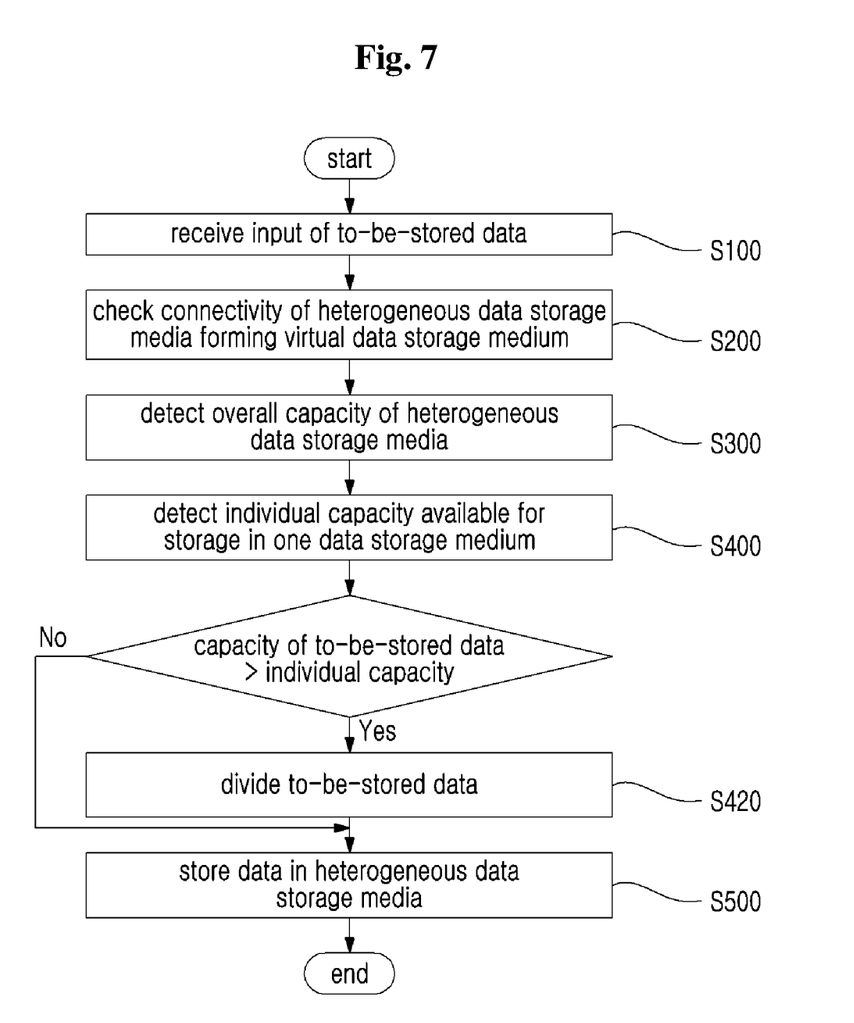

FIG. 6 and FIG. 7 are flowcharts illustrating a method of providing data using a system for providing a virtual data storage medium according to an embodiment of the invention.

As illustrated in FIG. 6 and FIG. 7, a method of providing data, or more specifically, a method of storing data according to this embodiment may be a method of providing data that is implemented by a federation unit included in a system for providing a virtual data storage medium based on the embodiment previously described above. The method may include receiving input of data that is to be stored (S100); checking the connectivity of the heterogeneous data storage media forming the virtual data storage medium (S200); detecting the overall capacity of the heterogeneous data storage media (S300); detecting the individual capacity available for storing data in one data storage medium from among the heterogeneous data storage media (S400); and storing the to-be-stored data in the heterogeneous data storage media (S500).

The operation of receiving input of to-be-stored data (S100) according to this embodiment of the invention is to receive the data that is to be stored as input from a data storage user.

When the data to be stored is inputted, the connectivity of the heterogeneous data storage media may be checked (S200). This entails checking whether or not the heterogeneous data storage media forming the virtual data storage medium can be connected.

The operation of detecting the overall capacity of the heterogeneous data storage media (S300) is to determine whether or not the data can be stored based on the overall capacity of the heterogeneous data storage media, so as to ascertain the data storage space. If it is determined, based on the result of the detection, that the overall capacity of the heterogeneous data storage media is greater than the capacity of the data that is to be stored, then the process for storing the data may be performed; otherwise, the procedure for storing the data in the heterogeneous data storage media can be stopped, and a message can be transmitted notifying the user of the failure.

Regarding the operation of detecting the individual capacity available for storing data in one of the heterogeneous data storage media (S400), it may not be necessary to divide data if the data that is to be stored does not exceed the individual capacity available for storing in a data storage medium, but as in illustration in FIG. 7, if the to-be-stored data does exceed the individual capacity available for storing in a data storage medium, then the data may be divided (S420) and stored in two or more data storage media comprising the heterogeneous data storage media. Furthermore, when the data that is to be stored is stored in a divided form in the heterogeneous data storage media, the to-be-stored data can be divided according to a division policy set by the user.

Lastly, the data may be stored in one data storage medium or two or more data storage media comprising the heterogeneous data storage media (S500). Of course, the storage location and sharing policy of the data may be managed together.

Figure 8:
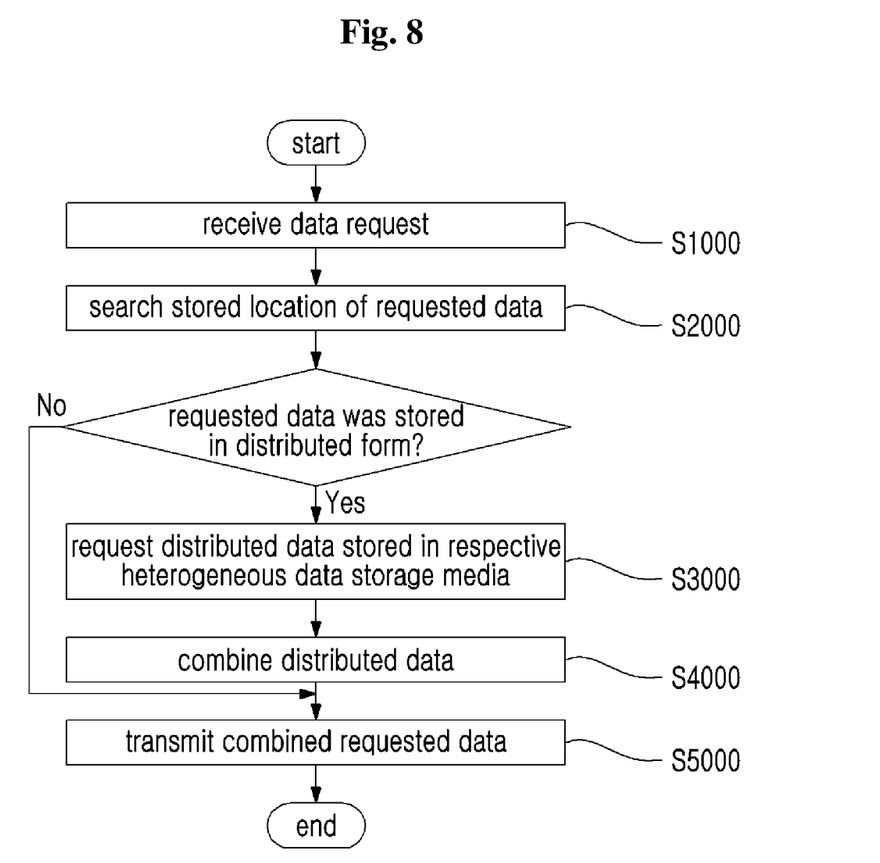
FIG. 8 is a method of providing data using a system for providing a virtual data storage medium according to another embodiment of the invention.

FIG. 8 is a method of providing data using a system for providing a virtual data storage medium according to another embodiment of the invention.

As illustrated in FIG. 8, a method of providing data, or more specifically, a method of combining and transmitting data according to this embodiment may be a method of providing data that is implemented by a federation unit included in a system for providing a virtual data storage medium based on the embodiment previously described above. The method may include receiving a data request (S1000); searching the stored location of the requested data (S2000); if the requested data is stored in a distributed form, requesting the distributed data stored respectively in the heterogeneous data storage media (S3000); combining the distributed data (S4000); and transmitting the combined requested data (S5000).

Descriptions that are redundant from the previously described embodiment are omitted.

When a data request is received (S1000) from a data storage user or another user, the stored location of the requested data may be searched (S2000). This operation is to search and find where the requested data is located in the respective data storage media comprising the heterogeneous data storage media. For data that was divided, this operation may search the locations of two or more data storage media.

If the requested is stored in a distributed form, procedures for requesting the stored distributed data from the respective heterogeneous data storage media (S3000) and recombining the distributed data (S4000) may be performed. For data of a distributed form, the location of the data may be ascertained and transmitted, whereas if for data of a distributed form, the data may be combined and transmitted (S5000).

While the present invention is described above with reference to embodiments illustrated in the drawings, such embodiments are examples only, and the person having ordinary skill in the art would understand that numerous variations and other equivalent embodiments can be derived from such embodiments. Therefore, the true scope of protection of the present invention is to be defined by the technical spirit conveyed in the appended claims.

What is claimed is:

1. A system for providing a virtual data storage medium using data storage federation, the system comprising:
    a heterogeneous data storage medium including a plurality of data storage media, each of which is using different interfaces, protocols, and commands for using stored data, wherein the plurality of data storage media include at least one first external storage device that is directly connected to the system via a dedicated cable without passing through a network, and at least one second external storage device that is connected to the system via a network; and
    a federation unit configured to generate a virtual data storage medium by federating the heterogeneous data storage medium including the plurality of data storage media, wherein the federation unit comprises a protocol conversion module configured to convert a user input directed to the virtual data storage medium to be compatible with the first external storage device or with the second external storage device,
    wherein, when the user input is only compatible to the second external storage device that is connected to the system via the network, the protocol conversion module configured to convert the user input that is only compatible to the second external storage device to be compatible with the first external storage device that is directly connected to the system via the dedicated cable without passing through the network, and
    wherein, when the user input is only compatible to the first external storage device that is directly connected to the system via the dedicated cable without passing through the network, the protocol conversion module configured to convert the user input that is only compatible to the first external storage device to be compatible with the second external storage device that is connected to the system via the network.

2. The system for providing a virtual data storage medium according to claim 1, wherein the federation unit comprises a policy management module configured to store data in the virtual data storage medium in correspondence with a data sharing policy set by a user.

3. The system for providing a virtual data storage medium according to claim 1, wherein the federation unit comprises a virtualization module configured to form a storage medium by virtualizing heterogeneous data storage media and providing a portion thereof independently to a user.

4. The system for providing a virtual data storage medium according to claim 1, wherein the federation unit comprises:
    a data location management module configured to manage locations for storing data and form a data sharing environment usable by another user by virtualizing data; and
    a shared data provision module configured to provide shared data according to a policy set by a data storage provider.

5. The system for providing a virtual data storage medium according to claim 1, wherein the federation unit comprises a data processing module configured to divide inputted data or combine data stored in a divided form.

6. A method of providing data by using a system for providing a virtual data storage medium, the method performed by a federation unit included in the system for providing a virtual data storage medium according to claim 1, the method comprising:
    receiving input of to-be-stored data;
    checking a connectivity of heterogeneous data storage media forming a virtual data storage medium;
    detecting an overall capacity of the heterogeneous data storage media;
    detecting an individual capacity available for storing data in one data storage medium from among the heterogeneous data storage media; and
    storing the to-be-stored data in the heterogeneous data storage media.

7. The method of providing data according to claim 6, wherein, if a capacity of the to-be-stored data exceeds the capacity of the one data storage medium, then the operation of storing the to-be-stored data in the heterogeneous data storage media comprises dividing the to-be-stored data and storing the to-be-stored data in a divided form in the heterogeneous data storage media.

8. The method of providing data according to claim 7, wherein the operation of dividing the to-be-stored data and storing the to-be-stored data in a divided form in the heterogeneous data storage media comprises dividing the to-be-stored data in accordance to a division policy set by a user.

9. A recorded medium readable by a computer and having recorded thereon a program of instructions for performing the method of providing data according to claim 7.

10. A method of providing data by using a system for providing a virtual data storage medium, the method performed by a federation unit included in the system for providing virtual data storage according to claim 1, the method comprising:
  receiving a data request;
  searching a stored location of requested data;
  requesting distributed data stored respectively in heterogeneous data storage media, if the requested data is stored in a distributed form;
  combining the distributed data; and
  transmitting the combined requested data.

11. The system according to claim 1, wherein the federation unit provides, to a user, data stored in the plurality of data storage media in a catalogued format that enables searches by the user.

12. A system for providing a virtual data storage medium using data storage federation, the system comprising:
  a heterogeneous data storage medium including a plurality of data storage media, each of which is using different interfaces, protocols, and commands for using stored data, wherein the plurality of data storage media include at least one first external storage device that is directly connected to the system via a dedicated cable without passing through a network, and at least one second external storage device that is connected to the system via a network; and
  a federation unit configured to generate a virtual data storage medium by federating the heterogeneous data storage medium including the plurality of data storage media, wherein the federation unit comprises a protocol conversion module configured to convert a user input directed to the virtual data storage medium to be compatible with the first external storage device or with the second external storage device, wherein
  the at least one second external storage device comprises a network-attached storage (NAS) that uses a Small Computer System Interface (SCSI) protocol to communicate with the system,
  the plurality of data storage media further include at least one third external storage comprising a storage area network (SAN) that uses a Transmission Control Protocol/Internet Protocol (TCP/IP) to communicate with the system, and
  the protocol conversion module configured to:
  when the user input is only compatible to the first external storage device that is directly connected to the system via the dedicated cable without passing through the network, the protocol conversion module configured to convert the user input that is only compatible to the first external storage device to be compatible with the TCP/IP, and also convert the user input to be compatible with the SCSI protocol,
  when the user input is only compatible to the SCSI protocol, convert the user input to be compatible with the first external storage device that is directly connected to the system via the dedicated cable without passing through the network, and also convert the user input to be compatible with the TCP/IP, and
  when the user input is only compatible to the TCP/IP, convert the user input to be compatible with the first external storage device that is directly connected to the system via the dedicated cable without passing through the network, and also convert the user input to be compatible with the SCSI protocol.

\* \* \* \* \*